United States Patent
Soria et al.

(10) Patent No.: US 9,897,007 B2
(45) Date of Patent: Feb. 20, 2018

(54) THRUST REVERSER-INTEGRATED TRACK BEAM AND INNER FIXED STRUCTURE

(71) Applicant: Rohr, Inc., Chula Vista, CA (US)

(72) Inventors: Christian Soria, La Mesa, CA (US); Song Chiou, Cerritos, CA (US); Michael J. Layland, Bonita, CA (US); Claude Hubert, Riverside, CA (US)

(73) Assignee: Rohr, Inc., Chula Vista, CA (US)

( * ) Notice: Subject to any disclaimer, the term of this patent is extended or adjusted under 35 U.S.C. 154(b) by 946 days.

(21) Appl. No.: 13/949,976

(22) Filed: Jul. 24, 2013

(65) Prior Publication Data
US 2014/0030087 A1    Jan. 30, 2014

Related U.S. Application Data

(60) Provisional application No. 61/675,301, filed on Jul. 24, 2012.

(51) Int. Cl.
*F01D 25/28* (2006.01)
*B64D 29/06* (2006.01)
(Continued)

(52) U.S. Cl.
CPC .................. *F02C 7/20* (2013.01); *F02K 1/72* (2013.01); *F02K 1/827* (2013.01); *Y02T 50/672* (2013.01)

(58) Field of Classification Search
CPC ..... F02K 1/09; F02K 1/08; F02K 1/72; F02K 1/58; F02K 1/827; Y02T 50/672;
(Continued)

(56) References Cited

U.S. PATENT DOCUMENTS

| 4,585,189 A | 4/1986 | Buxton |
| 4,697,763 A | 10/1987 | Vermilye |

(Continued)

OTHER PUBLICATIONS

Extended EP Search Report dated Feb. 28, 2017.

*Primary Examiner* — Woody Lee, Jr.
*Assistant Examiner* — Joshua R Beebe
(74) *Attorney, Agent, or Firm* — O'Shea Getz P.C.

(57) ABSTRACT

A panel for a nacelle structure that surrounds a jet engine core includes a longitudinally extending, generally semicircular center region, an upper bifurcation region, a lower bifurcation region, a hinge beam region extending from the upper bifurcation region and configured to receive an upper thrust reverser track guide, and a latch beam region extending from the lower bifurcation region and configured to receive a lower thrust reverser track guide. A bypass duct is formed in a space between the panel and the nacelle structure. A hinge beam structure and latch beam structure are integrally formed with the panel. An inner skin layer extends continuously across a bond panel surface generally facing the engine core and an outer skin layer extends continuously across a bond panel surface generally facing the bypass duct, the inner and outer skin layers extending across the center region, upper and lower bifurcation regions, hinge beam region, and latch beam region. The outer skin layer may have an acoustic treatment, such as being perforated in at least the center region and the upper and lower bifurcation regions. In this way, a separate hinge beam and latch beam are not used, and therefore there is no need to couple the panel to the respective beams.

22 Claims, 6 Drawing Sheets

(51) Int. Cl.
  *F02C 7/20*      (2006.01)
  *F02K 1/72*      (2006.01)
  *F02K 1/82*      (2006.01)

(58) Field of Classification Search
  CPC ...... B64D 29/06; B64D 33/04; B64D 33/045;
        F01D 25/28; F01D 25/24; F01D 25/265;
        F05B 2250/60; F05B 2250/61; F05D
        2260/96; F05D 2270/051; F05D 2220/205
  See application file for complete search history.

(56) References Cited

U.S. PATENT DOCUMENTS

| | | | |
|---|---|---|---|
| 5,083,426 A * | 1/1992 | Layland | F02K 1/78 |
| | | | 428/116 |
| 5,251,435 A * | 10/1993 | Pauley | B64D 29/00 |
| | | | 244/54 |
| 5,350,136 A | 9/1994 | Prosser et al. | |
| 5,372,338 A | 12/1994 | Carlin et al. | |
| 5,603,471 A * | 2/1997 | Armstrong | B64D 29/00 |
| | | | 239/265.31 |
| 6,051,302 A * | 4/2000 | Moore | B29C 70/08 |
| | | | 239/265.19 |
| 6,340,135 B1 | 1/2002 | Barton | |
| 8,627,644 B2 | 1/2014 | Vauchel | |
| 8,899,917 B2 | 12/2014 | Bajusz et al. | |
| 2004/0237502 A1* | 12/2004 | Moe | F02C 7/045 |
| | | | 60/204 |
| 2008/0016844 A1 | 1/2008 | Shutrump | |
| 2009/0258185 A1* | 10/2009 | Holland | B29C 73/06 |
| | | | 428/116 |
| 2010/0115958 A1* | 5/2010 | Parham | F02K 1/09 |
| | | | 60/771 |
| 2010/0126139 A1* | 5/2010 | Howe | F02K 1/1207 |
| | | | 60/226.2 |
| 2011/0167786 A1* | 7/2011 | Marques | F02K 1/386 |
| | | | 60/204 |
| 2013/0161415 A1 | 6/2013 | Bellanger et al. | |
| 2014/0003087 A1 | 1/2014 | Chen | |
| 2014/0145060 A1 | 5/2014 | Le Boulicaut | |
| 2015/0108250 A1 | 4/2015 | Aten | |

* cited by examiner

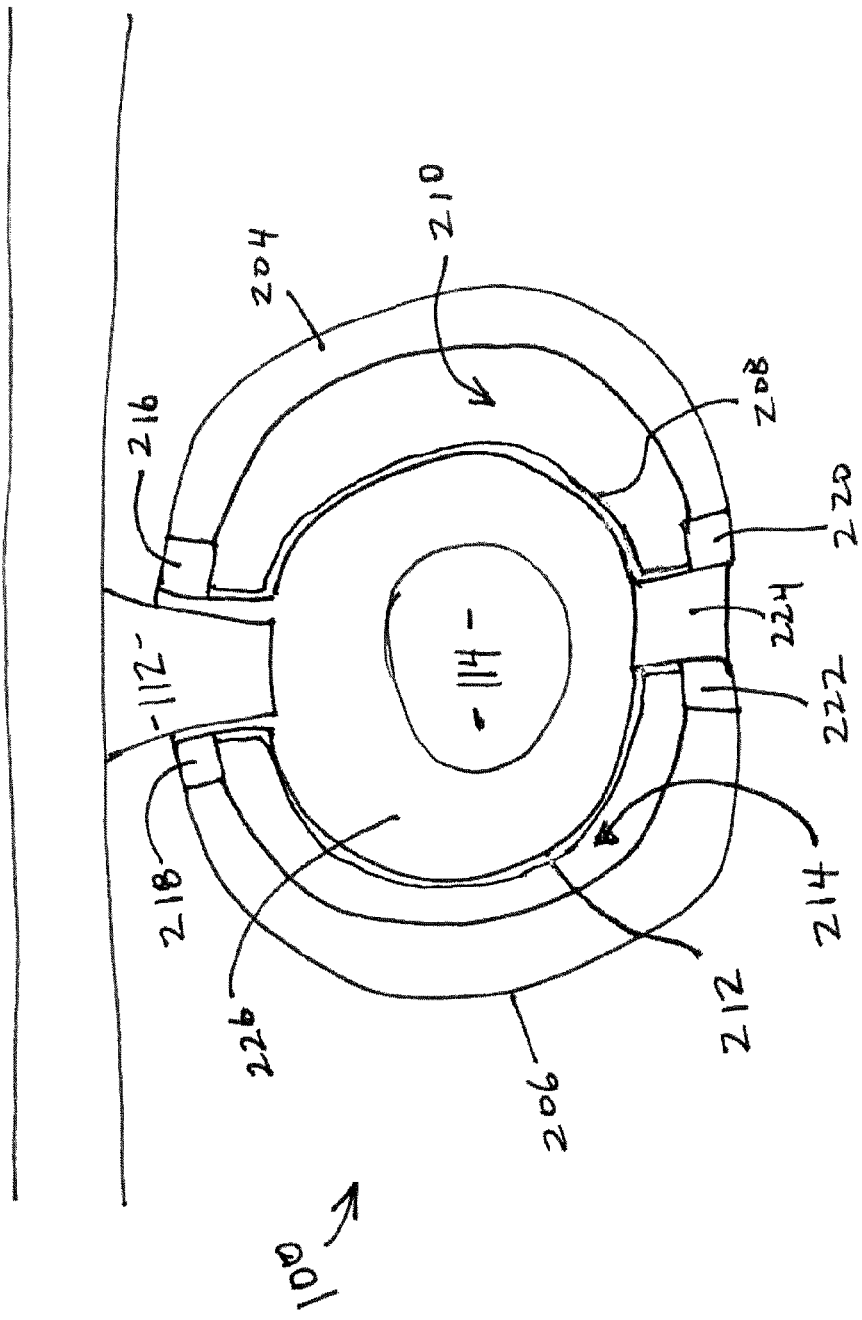

THRUST REVERSER-INTEGRATED TRACK BEAM AND INNER FIXED STRUCTURE

This application claims priority to U.S. Patent Appln. No. 61/675,301 filed Jul. 24, 2012

BACKGROUND

Nacelle structures for jet engines of an aircraft provide a housing within which the jet engine is supported. The nacelle structure typically includes two substantially semicircular halves that are coupled together to shroud the jet engine core. The nacelle structure also typically includes a thrust reverser that can provide assistance in slowing the aircraft by redirecting the engine thrust. The thrust reverser includes a panel of the nacelle that is translated between a stowed position, for normal operation during flight, and a deployed position, for redirecting the engine thrust, such as during landing of the aircraft. The thrust reverser panel slides along a track beam to move between the stowed position and the deployed position.

Thrust reverser track beams support the thrust reverser panel during translation and join the thrust reverser panels to internal fixed structure and to an engine pylon for underwing carriage of the nacelle structure. Other installations of jet engines may enclose the engine core within a fuselage portion of the aircraft, in which case the track beams join the thrust reverser panels to the aircraft fuselage.

Each nacelle half is typically coupled to an engine pylon at the top of the nacelle structure by a hinge beam and is typically coupled to a latch structure at the bottom of the nacelle by a latch beam. The nacelle halves pivot about the hinge beams and are latched together by the latch beams.

Within the space enclosed by the nacelle structure, a bond panel is attached to the inner side of each nacelle half, placed between the engine core and the nacelle half. Each bond panel extends generally from the top of each nacelle half at the hinge beam to the bottom of each nacelle half at the latch beam. A bypass duct for airflow is formed between the outward-facing bond panel surface and the inner surface of each nacelle half. The bond panel of each respective nacelle half is coupled to the hinge beam along a longitudinal edge at the top of the panel and is coupled to the latch beam along a longitudinal edge at the bottom of the panel.

A conventional bond panel has a sandwich construction of an aluminum honeycomb core and a flat composite skin layer attached to the honeycomb core on the inner honeycomb side (toward the engine core) and a flat composite skin layer attached on the outer honeycomb side (toward the bypass duct). The honeycomb core has multiple honeycomb cells. The inner surface of the bond panel may be covered with a thermal blanket, to protect the bond panel and other components from the heat of the engine core.

The composite skin layer of the bond panel's outer honeycomb side, which generally forms part of the bypass duct, typically includes perforations in the skin. The perforations are arranged so that at least one perforation is aligned with each cell of the underlying honeycomb core. The perforations and honeycomb core make use of the well-known Helmholtz resonator effect for noise attenuation.

The size of the honeycomb cells may vary between the curved surface areas of the bond panel and the flatter regions of the bond panel, which are located between the curved surface and the attaching beams, and are referred to as bifurcation regions. The honeycomb cell volumes of the individual cells in the bifurcation regions are significantly reduced as compared to the cell volumes outside of the bifurcation regions, often by a factor of twenty times or more, to account for the severe loads on the bond panel in the bifurcation regions.

The strength requirements for the bond panel in the bifurcation regions call for an increased density honeycomb core and a lack of composite skin perforations in the bifurcation regions. The density of the honeycomb core is increased by utilizing cells having smaller volume (i.e., tighter spacing), or by increased wall thickness, or both. The perforations are omitted in the bifurcation regions because the perforations would otherwise compromise the structural integrity of the bifurcation regions beyond what would be acceptable for a conventional construction, given the structural loads to the bifurcation regions. As noted above, the bond panel is coupled to the hinge beam and latch beam along outer edges of corresponding bifurcation regions. Each panel-to-beam coupling is achieved by riveting the bond panel to a planar surface of an extending wall of the respective beams. To ensure a secure coupling, typically two rows of rivets extending along the beam length are used. For many bond panels, in excess of one hundred rivets are required to fasten the bond panel to a beam. The rivets are not compatible with perforations in the bifurcation regions, which would unduly weaken the bond panel.

The increased honeycomb density and the lack of composite perforations in the bifurcation regions result in less than optimum noise attenuation characteristics and, coupled with the rivets, undesired weight for the bond panel and nacelle structure. Unfortunately, a not insignificant area of the bond panel in the bifurcation regions are part of the bypass duct. The reduced noise attenuation can result in difficulty meeting noise regulations for ground operation and can produce a louder, less enjoyable flight experience for passengers.

There is a need for improved bond panel construction that would increase the noise attenuation and reduce costs and weight of the bond panel. The present invention addresses that need.

SUMMARY

A panel for a nacelle structure that surrounds a jet engine core includes a longitudinally extending, generally semicircular center region, an upper bifurcation region extending radially from the center region, a lower bifurcation region extending radially from the center region, a hinge beam region extending from the upper bifurcation region and configured to receive an upper thrust reverser track guide, and a latch beam region extending from the lower bifurcation region and configured to receive a lower thrust reverser track guide. A bypass duct is formed in a space between the panel and the nacelle structure. The panel is configured so that the hinge beam region includes a lower flow portion that defines a portion of the bypass duct and an upper attachment portion that receives the upper thrust reverser track guide, and the latch beam region includes an upper flow portion that defines a portion of the bypass duct and a lower attachment portion that receives the lower thrust reverser track guide. The center region, upper bifurcation region, and lower bifurcation region are constructed from a honeycomb core having an inner honeycomb side generally facing the engine core and an outer honeycomb side generally facing the bypass duct. An inner skin layer extends continuously across a bond panel surface generally facing the engine core and an outer skin layer extends continuously across a bond panel surface generally facing the bypass duct, the inner and outer skin layers extending across the center region, upper and lower bifurcation regions, hinge beam region, and latch beam region. The outer skin layer may have an acoustic treatment, such as being perforated in at least the center region and the upper and lower bifurcation regions. With this construction, the hinge beam and latch beam are integrally formed with the panel. In this way, a separate hinge beam and latch beam are not used, and therefore there is no need to couple the panel to the respective beams. This reduces the weight of the nacelle and simplifies construction. The lack of rivets or other fastening mechanisms provides an aerodynamically smoother surface within the bypass duct, improving air flow. In addition, the acoustic treatment of the outer skin layer, such as the perforations, can be extended across a larger area of the panel as compared to a conventional construction, which improves the noise attenuation performance of the panel.

The honeycomb core and acoustic treatment of the outer skin layer can be extended to a larger area of the panel as compared to conventional constructions. For example, the lower flow portion of the hinge beam region and the upper flow portion of the latch beam region can be constructed of honeycomb core and perforated skin layer. Moreover, the upper attachment portion of the hinge beam region and the lower attachment portion of the latch beam region may be constructed of the outer skin layer, the inner skin layer, or both. In another construction feature, the hinge beam region may receive at least one hinge station along its axial length, and the hinge beam region may be constructed from a material other than the honeycomb core in a portion of the hinge beam region where the hinge station is received. Likewise, the latch beam region may receive at least one hinge station along its axial length, and the latch beam region may be constructed from a material other than the honeycomb core in a portion of the latch beam region where the hinge station is received.

Other features and advantages of the present invention should be apparent from the following description of the preferred embodiments, which illustrate, by way of example, the principles of the invention.

BRIEF DESCRIPTION OF THE DRAWINGS

FIG. 2 is a schematic cross-section view of the engine nacelle structure of FIG. 1a showing the nacelle halves and bond panel construction.

DETAILED DESCRIPTION

In the following description, various embodiments will be described. For purposes of explanation, specific configurations and details are set forth in order to provide a thorough understanding of the embodiments. It will also be apparent to one skilled in the art that the present invention can be practiced without the specific details described herein. Furthermore, well-known features may be omitted or simplified in order not to obscure the embodiment being described.

Improved acoustic benefits, such as more noise attenuation, and increased structural integrity, can be obtained in the bifurcation regions by the structure disclosed herein, which provides an engine bond panel integrated with hinge beam and latch beam structures, such that the bond panel honeycomb core cells and acoustic treatment can be extended into the bifurcation regions of the panel.

Figure 1A:
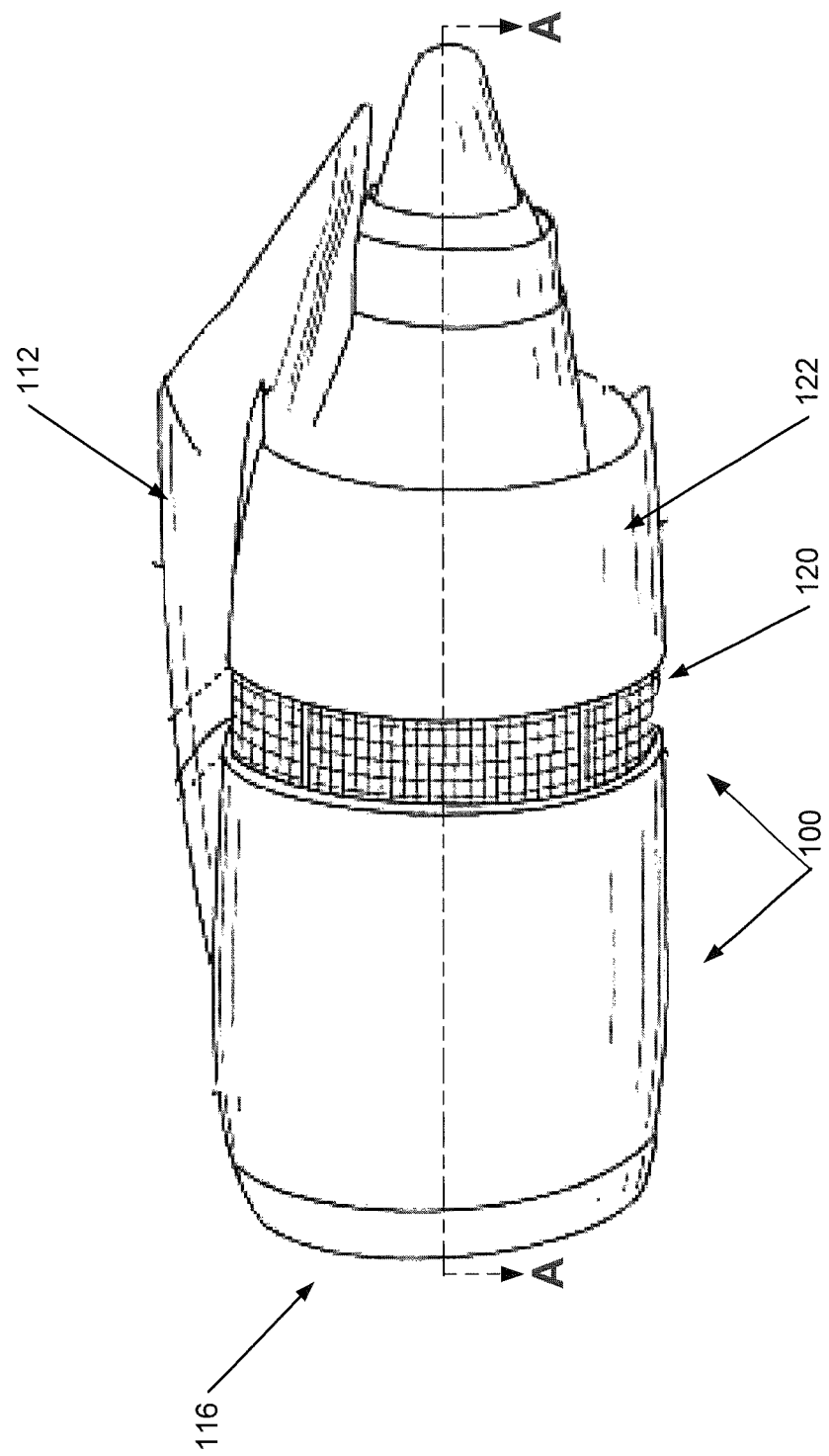
FIG. 1a is a perspective view of a turbofan jet engine nacelle that includes a thrust reverser with a hybrid beam in accordance with the embodiments disclosed herein.
Figure 1B:
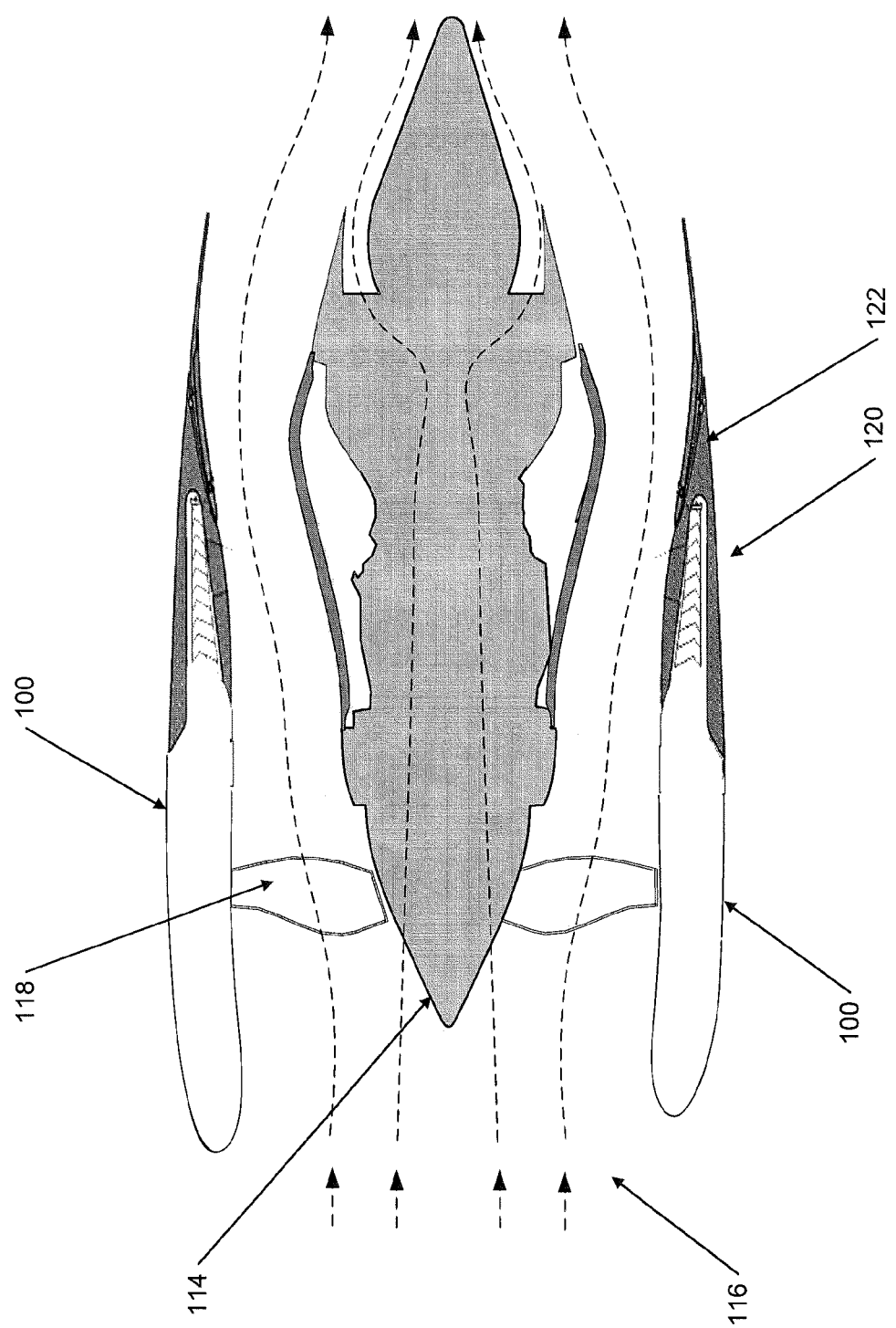
FIG. 1b is cross-section view of the turbofan jet engine and nacelle in FIG. 1a that includes a thrust reverser with a hybrid beam in accordance with the embodiments disclosed herein.

FIG. 1a is a perspective view of a turbofan jet engine enclosed within a nacelle structure 100 in accordance with embodiments described herein. FIG. 1a depicts a thrust reverser of the nacelle structure in the deployed condition. FIG. 1b depicts a cross-section of the engine 114 and nacelle structure 100 with the thrust reverser in the stowed condition. The engine is supported from a wing of an aircraft by a pylon structure 112. An inlet portion 116 of the engine nacelle 100 is located at a forward end of the nacelle, toward the left in FIG. 1a, and channels air to the engine 114 (FIG. 1b). A fan portion 118 of the inlet comprises a portion in which fan blades compress the incoming air stream. A thrust reverser portion 120 towards the aft end of the nacelle 100 comprises a portion where a thrust reverser may be deployed to help slow the aircraft upon landing. A thrust reverser panel 122 slides along a path defined by one or more track guides within the nacelle in a manner known to those skilled in the art. When the thrust reverser panel is deployed, it causes thrust from the jet engine to be diverted, or reversed, so that aircraft speed is reduced.

FIG. 2 is a schematic cross-section view of the engine nacelle structure 100 of FIG. 1a showing the nacelle structure supported from a wing by the pylon structure 112. The nacelle structure 100 includes a right half nacelle panel 204 and a left half nacelle panel 206. A right bond panel 208 is attached to the right half 204 and forms a bypass duct 210 in the space between the bond panel 208 and the right nacelle half 204. A left bond panel 212 is attached to the left half 206 and forms a bypass duct 214 in the space between the bond panel 212 and the left nacelle half 206. At the top of the nacelle structure, the right bond panel 208 and right nacelle half 204 are rotationally coupled to the pylon structure 112 at a hinge connection 216, and the left bond panel 212 and left nacelle half 206 are rotationally coupled to the pylon structure at a hinge connection 218. At the bottom of the nacelle structure, the right bond panel 208 and right nacelle half 204 are latchably coupled at a latch connection 220, and the left bond panel 212 and left nacelle half 206 are latchably coupled at a latch connection 222. The latch connections 220, 222 may be coupled together or each may be coupled to other structural components such as a latch coupling 224 to latch the two nacelle halves 204, 206 and keep them stationary during engine operation.

Figure 3:
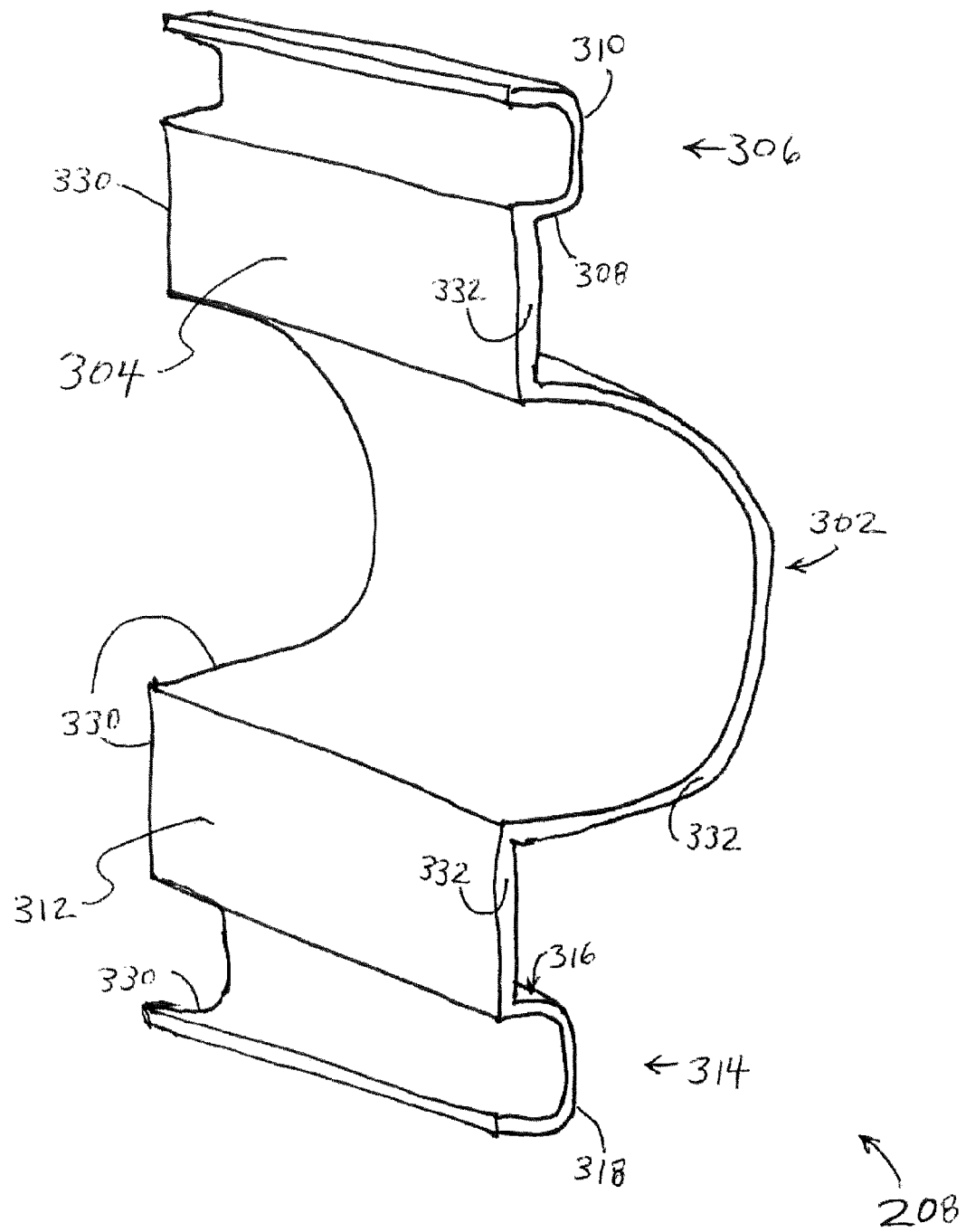
FIG. 3 is a perspective view of the right-side bond panel illustrated in FIG. 2.

FIG. 3 is a perspective view of the right-side bond panel 208 illustrated in FIG. 2. The upper end of the bond panel is toward the upper edge of the drawing sheet and the lower end of the bond panel is toward the lower edge of the drawing sheet. The right-side bond panel 208 includes a center region 302 that extends along a longitudinal axis of the jet engine core 114 (FIG. 2). The center region has a generally semicircular cross-section with a radius of curvature that is slightly larger than the corresponding radius of the engine 114. The configuration of the center region 302 is generally similar to the outer configuration of the engine so as to conform to the engine shape. That is, if the engine is generally cylindrical, then the center region is cylindrical; if the engine has a more bulbous shape, then the center region has a more bulbous shape. The right bond panel 208 also includes a substantially planar upper bifurcation region 304 that extends radially from the center region. The upper bifurcation region terminates at a curved hinge beam region 306. The hinge beam region serves as an attachment mechanism for coupling the bond panel 208 to the hinge connection 216 (FIG. 2). In a conventional nacelle construction, an engine bond panel terminates at an upper bifurcation region and is attached to a separate hinge beam, which is then separately attached to internal fixed structure for support. In the disclosed construction, there no longer is a need for a separate hinge beam, as its function is integrated into the construction of the bond panel 208. The hinge beam region 306 includes a lower flow portion 308 that defines a portion of the bypass duct 210 (FIG. 2) and includes an upper attachment portion 310 that is configured to receive one or more track guides for supporting a thrust reverser panel or other nacelle structures. The right bond panel 208 also includes a substantially planar lower bifurcation region 312 that extends radially from the center region 302. The lower bifurcation region terminates at a curved latch beam region 314. The latch beam region serves as an attachment mechanism for coupling the bond panel 208 to the latch connection 220 (FIG. 2). In a conventional nacelle construction, an engine bond panel terminates at a lower bifurcation region and is attached to a separate latch beam, which is attached to internal fixed structure for support. In the disclosed construction, there no longer is a need for a separate latch beam, as its function is integrated into the construction of the bond panel 208. The latch beam region 314 includes an upper flow portion 316 that defines a portion of the bypass duct 210 (FIG. 2) and includes a lower attachment portion 318 that is configured to receive one or more track guides or latch mechanisms for supporting a thrust reverser panel or other nacelle structures.

The FIG. 3 illustration is not to scale, but is presented for purposes of illustration only. Further, the construction illustrated in FIG. 3 for the right-side bond panel 208 is exemplary for purposes of illustration, and it should be understood that similar construction and features are also provided at the left-side bond panel 212. The bond panel 208 extends longitudinally along the engine axis for a length substantially equal to the engine core. Thus, the length from a substantially vertical forward edge 330 of the bond panel 208 to a substantially vertical aft edge 332 of the bond panel is typically on the order of 15-20 feet, depending on the jet engine and nacelle with which the bond panel will be used. The vertical extent of the upper and lower bifurcation regions 304, 314 are generally on the order of 3-5 feet, again depending on the jet engine and nacelle with which the bond panel will be used. The vertical extent of the hinge beam region 306 and the latch beam region 314 will generally be on the order of less than about 20-35% of the length of their corresponding upper and lower bifurcation regions 304, 314, again depending on the jet engine and nacelle with which the bond panel will be used. It should be understood that exact surface contours and other details of construction of the bond panel will depend on the jet engine and nacelle with which the bond panel will be used, such that the bond panel may incorporate various openings, fixtures, irregularities, and the like to accommodate engine and nacelle components not illustrated.

Figure 4:
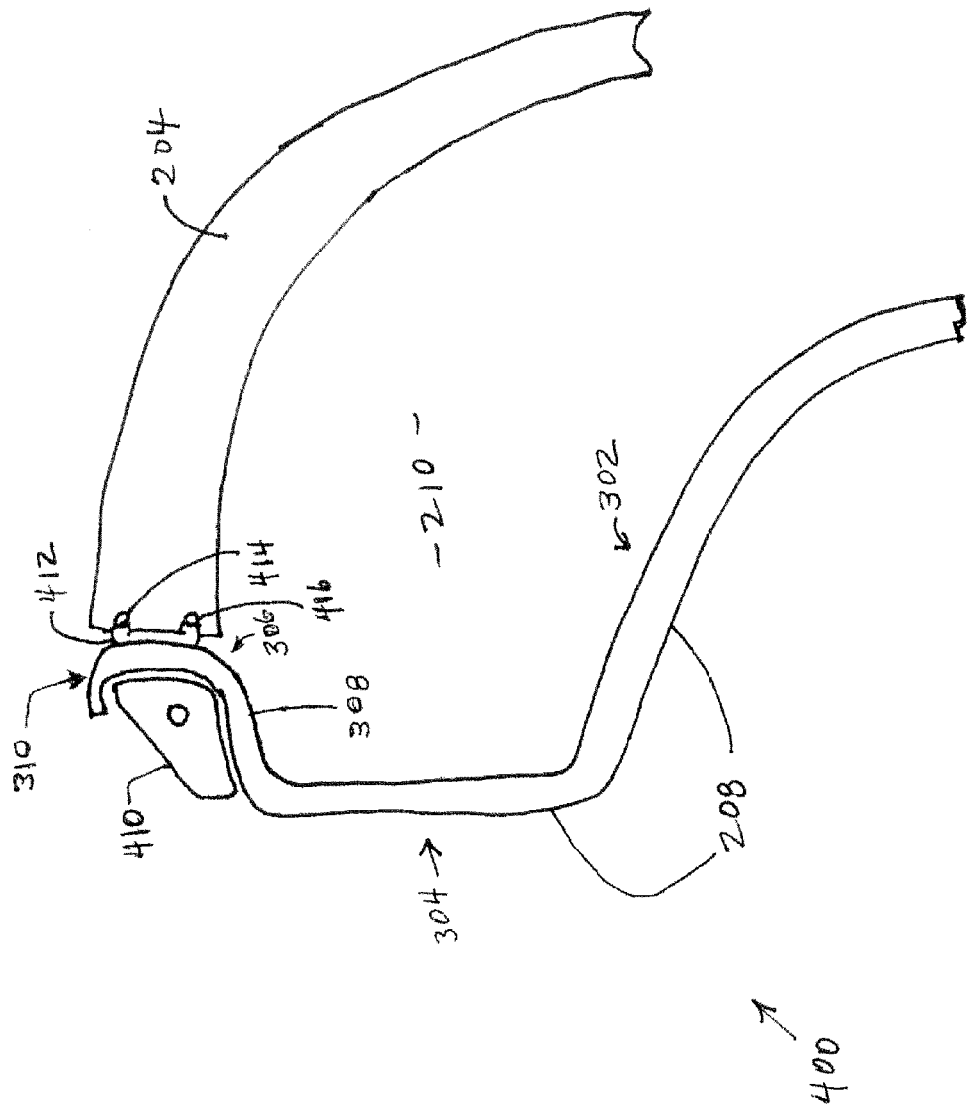
FIG. 4 is an enlarged cross-section view of a portion of the bond panel structure of FIG. 3 showing details of the upper hinge region of the panel.

FIG. 4 is an enlarged cross-section view of a portion of the engine nacelle structure 100 of FIG. 2 showing details of the right upper hinge region 306 of the panel in the area of the hinge connection 216. It should be understood that the construction illustrated in FIG. 4 for the upper right hinge connection 216 is exemplary for purposes of illustration, and it should be understood that similar construction and features are also provided at the upper left hinge structure 218, as well as at the lower right latch structure 220 and lower left latch structure 222. Such details will be known to those skilled in the art without further description.

The FIG. 4 illustration 400 shows the bypass duct 210 in the space generally between the right nacelle half 204 and the right bond panel 208. FIG. 4 shows the center region 302 that extends along a longitudinal axis of the jet engine core 114 (FIG. 2) and that has a generally semicircular cross-section, and shows the center region terminating at the upper bifurcation region 304 that extends radially from the center region. FIG. 4 shows that the hinge beam region 306 is configured to receive structures for attachment to inner fixed structure of the nacelle and aircraft. In FIG. 4, these structures are illustrated as a hinge station 410 and an upper thrust reverser track guide 412, which are received at the upper attachment portion 310. The thrust reverser track guide 412 includes an upper track 414 and a lower track 416, to which is coupled the right side nacelle half 204, which in this context may comprise a thrust reverser panel. FIG. 4 also shows that the lower flow portion 308 defines a portion of the bypass duct 210.

It should be appreciated that the lower portion of the engine nacelle structure includes similar structures to those identified in FIG. 4, generally repeated at the bottom of the bond panel 208. For example, the latch beam region 314 is configured to receive structures for attachment to inner fixed structure of the nacelle and aircraft, comprising a hinge station and a lower thrust reverser track guide, which are received at the lower attachment portion 318. The thrust reverser track guide includes an upper track and a lower track, to which is coupled the right side nacelle half 204, which in this context may comprise a thrust reverser panel.

Figure 5:
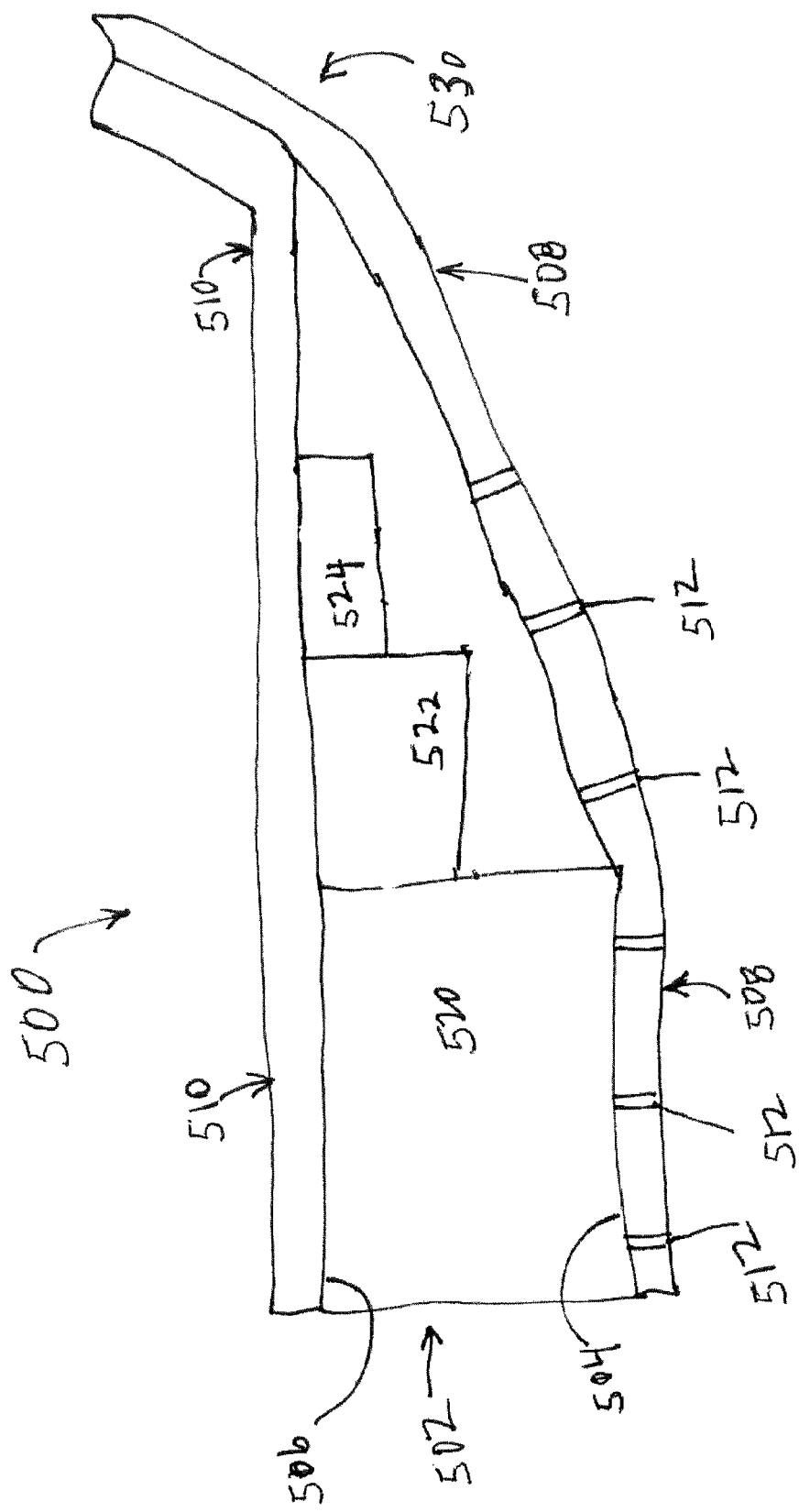
FIG. 5 is an enlarged cross-section view of a portion of the panel of FIG. 4 showing the transition from honeycomb core to skin layer.

FIG. 5 illustrates the construction of the right and left bond panels, and shows an enlarged cross-section view of a portion of the panel of FIG. 4 showing the construction that extends from the center region through the bifurcation region and hinge/latch regions. FIG. 5 also shows the transition from the honeycomb core construction to an exclusively skin layer construction. As described further below, an inner skin layer extends continuously across a bond panel surface generally facing the engine core, and an outer skin layer extends continuously across a bond panel surface generally facing the bypass duct, and the inner and outer skin layers extend continuously across the center region, upper and lower bifurcation regions, hinge beam region, and latch beam region.

The bond panel portion 500 illustrated in FIG. 5 includes a honeycomb core 502 having an inner honeycomb side 504 generally facing the engine core and includes an outer honeycomb side 506 generally facing the bypass duct. Bonded to the honeycomb core 502 at the inner honeycomb side 504 is an inner skin layer 508 that extends continuously across the bond panel surface generally facing the engine core, and bonded to the honeycomb core 502 at the outer honeycomb side 506 is an outer skin layer 510 that extends continuously across the bond panel surface generally facing the bypass duct. The inner and outer skin layers 508, 510 extend across the center region, upper and lower bifurcation regions, hinge beam region, and latch beam region. The inner skin layer 508 is perforated in at least the center region and the upper and lower bifurcation regions. The perforations 512 extend through the inner skin layer so that airflow in the bypass duct 210 (FIG. 4) can pass into one or more cells of the honeycomb core 502. The passing of airflow into the honeycomb cells utilizes the Helmholtz resonator effect to attenuate noise levels that would otherwise emanate from the nacelle structure.

FIG. 5 illustrates the transition in the bond panel 208 from the lower flow portion 308 to the upper attachment portion 310 (FIGS. 3, 4). The honeycomb core includes a portion of lesser density 502, sometimes referred to as field core, and includes a portion of tapered honeycomb core thickness that may include higher density honeycomb core material 522, 524 having progressively greater density toward the upper attachment portion 310. In this context, the "density" of the honeycomb core may relate to the cell volume, cell wall thickness, or both. For an increased honeycomb core density, the volume of each cell in the honeycomb core may decrease, or the cell wall thickness may increase, or both, in the taper honeycomb core portions 522, 524 as compared with the cells in the field core portion 520. A portion 530 of the bond panel 208 eventually has insufficient thickness to accommodate any honeycomb core material between the inner skin layer 508 and the outer skin layer 510, such that the bond panel eventually comprises just the inner and outer skin layers bonded to each other. This type of construction generally occurs in the transition from the lower flow portion 406 to the upper attachment portion 408 at the upper region of the nacelle structure. In an alternative construction, the portion 530 may be constructed of only the outer skin layer or only the inner skin layer. That is, the outer skin layer or the inner skin layer extends all the way to the end of the upper attachment portion, and the other skin layer is terminated or cut short of the end of the upper attachment portion. The construction illustrated in FIG. 5 is exemplary for purposes of illustration, and it should be understood that similar construction and features are also provided at the left-side and right-side panels in the latch beam region 314.

As noted above, the hinge beam region receives at least one hinge station along its axial length, and the hinge beam region is constructed with a honeycomb core. In one embodiment, the hinge beam region does not have the honeycomb core in the portions of the hinge beam region where the hinge station is received. The lack of the honeycomb core in the hinge station portions can provide increased strength for the nacelle structure. Rather than the honeycomb core in the hinge station portions, alternative constructions can be utilized that provide increased strength. For example, the hinge station portions can be constructed from a solid composite material, or a solid metal material, or the like.

The inner skin layer or the outer skin layer or both, may be constructed of a composite material. For example, the composite material may comprise a carbon fiber woven material that is infused with a liquid resin material that is cured into a hardened condition. The honeycomb core may be constructed of a metal material, such as, for example, aluminum or titanium.

The structure disclosed herein extends noise attenuation benefits of the acoustically treated bond panel surface beyond the bifurcation regions and retains structural integrity in the bond panel by integrating the hinge beam and latch beam structures that were previously separate components that were attached to the bond panel in conventional construction. Details of construction may be adjusted depending on the intended environment of application. For example, with respect to hinge stations and track guides, conventional technology still generally utilizes metal lugs and fittings, so that the hinge stations and track guides are still fabricated from metal. Such features, however, may be constructed using composite techniques to provide non-metal bond panels with integrated hinge stations and track guides. Thus, the structure disclosed herein extends composite construction techniques into the entire bond panel structure and extends the use of the honeycomb core material and acoustic material into regions of the bond panel that have traditionally been metal and/or not treated with acoustic material.

Thus, the disclosed structure permits use of the honeycomb core throughout the bond panel and deploys acoustic treatment on the bond panel into substantially the entire bifurcation area and into the hinge beam and latch areas. In this way, the hinge beam region lower flow surface may include acoustic treatment and the hinge beam region upper attachment surface can have acoustic treatment. In addition, the attachment surface may include a laminate construction, where there is no need for acoustic treatment, and instead may use a solid composite construction comprising the two composite skin layers laminated together.

The structures disclosed herein may be adjusted in terms of dimensions and construction to provide desired strength and weight. For typical environments, the inner and outer skin layers are constructed from composite fiber with curable resin having a finished (cured) composite thickness of approximately 0.03 inch. The field core cells in the area of the center region typically have a width (distance between facing walls of each cell) of approximately ⅜ inch and the cells in the high density area (such as the bifurcation regions) typically have a width of ⅛ inch. The cell wall thickness of the honeycomb core usually corresponds to a weight value; in the field core regions, the density of the honeycomb core in the field core region is typically on the order of 4-5 pounds per cubic foot and the density in the high density regions is typically on the order of 12 pounds per cubic foot. Such densities typically correspond to about 3 mil thickness for field core, and about 6-10 mil for high density regions, for honeycomb core constructed of aluminum. Other materials, such as titanium, may be used for the honeycomb core.

The construction disclosed herein can also reduce the airflow drag in the bypass duct because the number of components for the joints and joinings is reduced. In addition, the lack of fasteners (rivets) and components results in a smoother internal surface for the bypass duct, resulting in reduced airflow losses. Weight savings can be obtained because of the reduced extent of high density honeycomb core in the bond panel. Honeycomb core of the field core variety can be used in a greater extent of the bond panel as compared to previous construction because of the lack of separate hinge beam and latch beam attachments. Thus, the construction disclosed herein provides a one-piece bond panel, with no need for fasteners to connect a hinge beam and latch beam to the bond panel. With the reduced number of fasteners comes a savings in weight.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A panel for a nacelle structure that surrounds a jet engine core, the panel comprising:
   a center region that extends along a longitudinal axis of the jet engine core;
   an upper bifurcation region extending radially from the center region;
   a lower bifurcation region extending radially from the center region;
   a hinge beam region extending from the upper bifurcation region and configured to receive an upper thrust reverser track guide;
   a latch beam region extending from the lower bifurcation region and configured to receive a lower thrust reverser track guide;
   wherein a bypass duct is formed in a space between the panel and the nacelle structure;
   wherein the hinge beam region includes a lower flow portion that defines a portion of the bypass duct and an upper attachment portion that receives the upper thrust reverser track guide, and wherein the latch beam region includes an upper flow portion that defines a portion of the bypass duct and a lower attachment portion that receives the lower thrust reverser track guide;
   wherein the center region, upper bifurcation region, and lower bifurcation region are constructed from a honeycomb core having an inner honeycomb side generally facing the engine core and an outer honeycomb side generally facing the bypass duct, and wherein an inner skin layer extends continuously across a bond panel surface generally facing the engine core and an outer skin layer extends continuously across a bond panel surface generally facing the bypass duct, the inner and outer skin layers extending across the center region, upper and lower bifurcation regions, hinge beam region, and latch beam region, and the outer skin layer is perforated in at least the center region and the upper and lower bifurcation regions; and
   wherein, within the upper attachment portion, the inner skin layer is bonded to the outer skin layer without any honeycomb core material therebetween.

2. A panel as in claim 1, wherein the lower flow portion of the hinge beam region is constructed from a honeycomb core having an inner honeycomb side generally facing the engine core and an outer honeycomb side generally facing the bypass duct, and the outer skin layer in the lower flow portion is perforated.

3. A panel as in claim 1, wherein the upper flow portion of the latch beam region is constructed from a honeycomb core having an inner honeycomb side generally facing the engine core and an outer honeycomb side generally facing the bypass duct, and the outer skin layer in the upper flow portion is perforated.

4. A panel as in claim 1, wherein the upper attachment portion of the hinge beam region and the lower attachment portion of the latch beam region are constructed of at least one of the outer skin layer or the inner skin layer.

5. A panel as in claim 1, wherein the hinge beam region receives at least one hinge station along its axial length, and the hinge beam region is constructed from a honeycomb core having an inner honeycomb side generally facing the engine core and an outer honeycomb side generally facing the bypass duct, except for a portion of the hinge beam region where the hinge station is received.

6. A panel as in claim 1, wherein the latch beam region receives at least one hinge station along its axial length, and the latch beam region is constructed from a honeycomb core having an inner honeycomb side generally facing the engine core and an outer honeycomb side generally facing the bypass duct, except for a portion of the latch beam region where the hinge station is received.

7. A panel as in claim 1, wherein at least one of the inner skin layer is constructed of a composite material or the outer skin layer is constructed of a composite material.

8. A panel as in claim 1, wherein the honeycomb core is constructed of a metal material.

9. A panel as in claim 1, wherein the hinge beam region has a generally C-shaped cross-sectional geometry.

10. A panel as in claim 1, wherein
    the lower flow portion extends laterally between the upper bifurcation region and the upper attachment portion such that the respective portion of the bypass duct is formed radially between the lower flow portion and the center region; and
    the upper attachment portion projects radially outward from the lower flow portion, and the upper attachment portion is integrated into the panel.

11. A panel as in claim 1, wherein a thickness of the panel defined between exterior surfaces of the inner and the outer skin layers decreases as the panel extends along the lower flow portion towards the upper attachment portion.

12. A panel as in claim 1, further comprising a second honeycomb core disposed next to the honeycomb core within the lower flow portion, wherein a thickness of the second honeycomb core which extends between the first and the second skin layers is smaller than a thickness of the honeycomb core which extends between the first and the second skin layers.

13. A panel as in claim 12, further comprising a third honeycomb core disposed next to the second honeycomb core within the lower flow portion, wherein the second honeycomb core is between the honeycomb core and the third honeycomb core, and wherein a thickness of the third honeycomb core which extends between the first and the second skin layers is smaller than the thickness of the second honeycomb core.

14. A panel for a nacelle structure that surrounds a jet engine core, the panel comprising a honeycomb core configured in a center region that extends along a longitudinal axis of the jet engine core, the center region having a generally semicircular cross-section, in an upper bifurcation region extending radially from the center region, in a lower bifurcation region extending radially from the center region, in a hinge beam region extending from the upper bifurcation region and configured to receive an upper thrust reverser track guide, and in a latch beam region extending from the lower bifurcation region and configured to receive a lower thrust reverser track guide;
    wherein a bypass duct is formed in a space between the panel and the nacelle structure;
    wherein the hinge beam region includes a lower flow portion that defines a portion of the bypass duct and an upper attachment portion that receives the upper thrust reverser track guide, and wherein the latch beam region includes an upper flow portion that defines a portion of the bypass duct and a lower attachment portion that receives the lower thrust reverser track guide;
    wherein an inner skin layer extends continuously from the upper attachment portion to the lower attachment portion, and an outer skin layer extends continuously from the upper attachment portion to the lower attachment portion, and wherein the outer skin layer is perforated in at least the center region and the upper and lower bifurcation regions;
    wherein, within the upper attachment portion, the inner skin layer is bonded to the outer skin layer without any honeycomb core material therebetween.

15. A panel as in claim 14, wherein the outer skin layer in the lower flow portion is perforated.

16. A panel as in claim 14, wherein the outer skin layer in the upper flow portion is perforated.

17. A panel as in claim 14, wherein the upper attachment portion of the hinge beam region and the lower attachment portion of the latch beam region are constructed of at least one of the outer skin layer or the inner skin layer.

18. A panel as in claim 14, wherein the hinge beam region receives at least one hinge station along its axial length, and the hinge beam region is constructed from a material other than the honeycomb core in a portion of the hinge beam region where the hinge station is received.

19. A panel as in claim 14, wherein the latch beam region receives at least one hinge station along its axial length, and the latch beam region is constructed from a material other than the honeycomb core in a portion of the latch beam region where the hinge station is received.

20. A panel as in claim 14, wherein at least one of the inner skin layer is constructed of a composite material or the outer skin layer is constructed of a composite material.

21. A panel as in claim 14, wherein the honeycomb core is constructed of a metal material.

22. A nacelle structure for an aircraft jet engine, comprising:
    an integrally formed bond panel structure comprising:
        a center region that extends along a longitudinal axis of the jet engine core;
        an upper bifurcation region extending radially from the center region; and
        a hinge beam region extending from the upper bifurcation region;
        wherein a bypass duct is formed partially by the integrally formed bond panel;
        wherein the hinge beam region includes a lower flow portion that defines a portion of the bypass duct and an upper attachment portion that receives the upper thrust reverser track guide;
        wherein the center region, upper bifurcation region are constructed from a honeycomb core having an inner honeycomb side generally facing an engine core of the aircraft jet engine and an outer honeycomb side generally facing the bypass duct;
        wherein an inner skin layer extends continuously across a bond panel surface generally facing the engine core and an outer skin layer extends continuously across a bond panel surface generally facing the bypass duct, the inner and outer skin layers extend across the center region, upper bifurcation region and hinge beam region, and the outer skin layer is perforated in at least the center region and the upper bifurcation region;
        wherein the lower flow portion extends laterally between the upper bifurcation region and the upper attachment portion such that the respective portion of the bypass duct is formed radially between the lower flow portion and the center region;
        wherein the upper attachment portion projects radially outward from the lower flow portion; and
        wherein, within the upper attachment portion, the inner skin layer is bonded to the outer skin layer without any honeycomb core material therebetween;
    an upper thrust reverser track guide mounted to the hinge beam region on a first side of the hinge beam region; and
    a hinge station mounted to the hinge beam region on a second side of the hinge beam region that is opposite the first side of the hinge beam region.

\* \* \* \* \*